United States Patent
Dooley et al.

(10) Patent No.: US 7,042,395 B2
(45) Date of Patent: *May 9, 2006

(54) METHOD OF PROVIDING AN ESTIMATE OF A LOCATION

(75) Inventors: Saul R. Dooley, Reigate (GB); Martin S. Wilcox, Reigate (GB); Andrew T. Yule, Felbridge (GB)

(73) Assignee: Koninkiljke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/635,141

(22) Filed: Aug. 6, 2003

(65) Prior Publication Data

US 2004/0027283 A1    Feb. 12, 2004

Related U.S. Application Data

(63) Continuation of application No. 09/882,083, filed on Jun. 15, 2001, now Pat. No. 6,646,603.

(30) Foreign Application Priority Data

Jun. 16, 2000    (GB) ................... 0014719.9

(51) Int. Cl.
  *G01S 3/02*    (2006.01)
  *G01S 5/14*    (2006.01)
(52) U.S. Cl. ................... 342/458; 342/357.08
(58) Field of Classification Search ........... 342/458, 342/457, 464, 357.08, 453, 357.1
See application file for complete search history.

(56) References Cited

U.S. PATENT DOCUMENTS

| | | | | |
|---|---|---|---|---|
| 5,451,964 A | * | 9/1995 | Babu | 342/357.06 |
| 5,841,026 A | * | 11/1998 | Kirk et al. | 73/178 R |
| 6,043,777 A | * | 3/2000 | Bergman et al. | 342/357.09 |
| 6,049,304 A | * | 4/2000 | Rudel et al. | 342/357.08 |
| 6,275,707 B1 | * | 8/2001 | Reed et al. | 455/456.3 |
| 6,646,603 B1 | * | 11/2003 | Dooley et al. | 342/458 |

FOREIGN PATENT DOCUMENTS

| WO | WO 98/09181 A1 | * | 3/1998 |
|---|---|---|---|
| WO | WO 99/63358 A1 | * | 12/1999 |

OTHER PUBLICATIONS

Stein, Barry et al, "COTS GPS C/A COde Receivers with Pseudolites for Range PLS Application," IEEE PLANS 1990, Mar. 1990, pp. 191-197.*

* cited by examiner

*Primary Examiner*—Gregory C. Issing

(57) ABSTRACT

A method of providing an estimate of the location of first and second devices MS1, MS2 comprising the steps of obtaining at least one range measurement from the first device MS1 to a known reference point BS1, GPS SVs; obtaining at least one range measurement from the second device MS2 to a known reference point BS1, GPS SVs, the second device MS2 being located near to the first device MS1; and calculating an estimate of the location of the devices MS1, MS2 using range measurements obtained with respect to both the first and second devices MS1, MS2.

24 Claims, 1 Drawing Sheet

METHOD OF PROVIDING AN ESTIMATE OF A LOCATION

RELATED APPLICATION

This is a continuation application of application Ser. No. 09/882,083, filed Jun. 15, 2001, now U.S. Pat. No. 6,646,603.

FIELD OF INVENTION

This invention relates to a method of determining the location of first and second devices.

BACKGROUND TO INVENTION

Recent progress in the field of GPS has enabled GPS receivers to be produced relatively cheaply leading to their widespread adoption and use. For example, one might envisage a home networking environment in which is provided a mobile telephone with GPS capability for providing its location to a cellular telephone network operator in-the event of an emergency call; a TV with GPS capability for providing TV access control, say as described in U.S. Pat. No. 5,621,793; and a personal computer with GPS and Internet capability for retrieving location specific information from a web site, say a local weather report.

In such a home networking environment, three GPS receivers are provided, each returning substantially the same location. However, especially indoors, it is unlikely that all three GPS receivers will each be able to acquire the four GPS space vehicle (SV) signals normally required to obtain a position fix, or at least not all of the time. One reason for this is obscuration of the GPS signals by buildings, walls and other urban paraphernalia.

U.S. Pat. No. 5,451,964 ("Babu") discloses a mobile GPS receiver station operating with a reference GPS receiver station wherein reference station pseudoranges and co-ordinates are transmitted from the reference station to the mobile station. In particular, Babu discloses where the reference pseudoranges are used to generate pseudorange corrections at the mobile station which are then applied to corresponding mobile station pseudoranges, themselves used to determine the position of the mobile station. By corresponding, one means that Babu discloses uses reference station pseudoranges to make corrects to mobile station pseudoranges necessarily obtained from the same satellites. Babu is in effect an implementation of differential GPS (DGPS) but slightly differently from conventional DGPS implementations in that the differential corrections are applied to individual mobile station pseudoranges rather than the resultant position fix.

It is an object of the present invention to provide a method of determining the location of a device which is more effective indoors.

SUMMARY OF INVENTION

According to a first aspect of the present invention, there is provided a method of providing an estimate of the location of first and second devices which are located near to each other, the method comprising the steps of:

obtaining at least one range measurement from the first device to a corresponding reference point;

obtaining at least one range measurement from the second device to a corresponding reference point, the second device being located near to the first device; and calculating an estimate of the location of the devices using (i) range measurements obtained with respect to both the first and second devices and (ii) the co-ordinates of the corresponding reference points, and wherein at least one range measurement obtained from the second device was obtained with respect to a reference point to which no range measurements were obtained from the first device.

Such a method enables an estimate of the location of the devices to be calculated in circumstances where it is impossible to unambiguously determine the location of the first device using only range measurements obtained from the first device, or the second device using only its range measurements obtained from the second device.

In particular, but not exclusively, the or each range measurement obtained with respect to the second device and for each such range measurement an indication of the associated reference point, e.g. in the form of a position co-ordinate, are provided to the first device for calculating an estimate of the location of the devices, preferably using a wireless communications link.

Where the range measurement information is provided from the second device to the first device using a short range communications link such as Bluetooth, one can safely assume that the devices are close together and that the resultant position fix is a good estimate of the true position of the first and second devices. Also, having calculating an estimate of the location of the devices at the first device, the estimate may then be provided to the second device.

Preferably, the first and second devices have reciprocal functionality in that the or each range measurement obtained with respect to the first device and for each such range measurement an indication of the associated reference point may also be provided to the second device for calculating an estimate of the location of the devices.

Alternatively, the or each range measurement obtained with respect to both the first and second devices and for each such range measurement an indication of the associated reference point may be provided to a third device for calculating an estimate of the location of the first and second devices.

At least one range measurement obtained with respect to either the first or the second device may be a pseudorange range measurement.

For example, the position determining means of the second device may include a GPS receiver wherein at least two range measurements obtained with respect to the second device are pseudorange measurements from a GPS SV. Also, the position determining means of the first device may also include a GPS receiver wherein at least two range measurements obtained with respect to the first device are pseudorange measurements from a GPS SV; and wherein at least 5 pseudorange are obtained with respect to either the first or the second device in total. I.e. sufficient to obtain a position fix.

NB. In order to calculate an estimate of the location of the first device using pseudorange measurements obtained with respect to both first and second devices, clocks errors of both the first and second devices must be resolved, i.e. the clock errors between the synchronized GPS SVs and each devices. Fortunately, however, pseudoranges may be more conveniently obtained than absolute range measurements and this may justify the extra computation.

Alternatively, where the position determining means of the first and second device both includes a GPS receiver and the first and second device are synchronized, a single pseudorange measurement from a GPS SV obtained with respect to either the first or second device may contribute to the position determination. Without synchronicity, the benefit of a device obtaining a single pseudorange is offset by the extra clock error introduced.

At least one range measurement obtained with respect to the first and/or the second device may be a range measurement to a ground based reference point. This information may then be combined with either other ground and or spaced based range or pseudorange measurements in order to obtain a position fix.

For example, this may be an absolute range measurement determined by a time-of-arrival measurement with respect to a fixed base station, and may be conveniently provided when the first and/or second device is a mobile cellular telephone able to communicate using a wireless communications link which is independent of any cellular basestation network. Synchronicity between a mobile cellular telephone and the cellular telephone network basestation with which it is registered is relatively easy to achieve, and thus an absolute range measurement may be readily obtained.

Also provided in accordance with the present invention is a device able is provide an estimate of the location as claimed in claims 19 to 27.

According to a second aspect of the present invention, there is provided a method of determining the position of a first GPS receiver with the assistance of a second, portable GPS receiver comprising the steps of:acquiring GPS signals in the second GPS receiver and deriving GPS signal information therefrom;

providing the GPS signal information from the second GPS receiver to the first GPS receiver; and acquiring GPS signals in the first GPS receiver using the GPS signal information provided by the second GPS receiver, and determining the position of the first GPS receiver therefrom.

The term "portable" is intended to mean that it could be conveniently carried from place to place by a human and would normally be carried from place to place by a human. As such, portable, would include a mobile telephone, a personal digital assistant (PDA), a palm-top computer or lap-top computer, all incorporating a GPS receiver.

Preferably, the first and second GPS receivers have reciprocal functionality in that the first GPS receiver may also acquire GPS signals and derive GPS signal information therefrom, and provide GPS signal information to the second GPS receiver; and that the second GPS receiver may acquire GPS signals using the GPS signal information provided by the first GPS receiver.

Also, it is desirable that the first GPS receiver provide this assistant whilst necessarily being able to determine its-own position, i.e. not be able to acquire the four GPS signals normally necessary to do so.

Also provided in accordance with the second aspect of the present invention is a GPS receiver unit 31 to 33.

BRIEF DESCRIPTION OF DRAWINGS

The above and other features and advantages of the present invention will be apparent from the following description, by way of example, of implementations of methods of the present invention with reference to the accompanying drawing in which.

DETAILED DESCRIPTION

Figure 1:
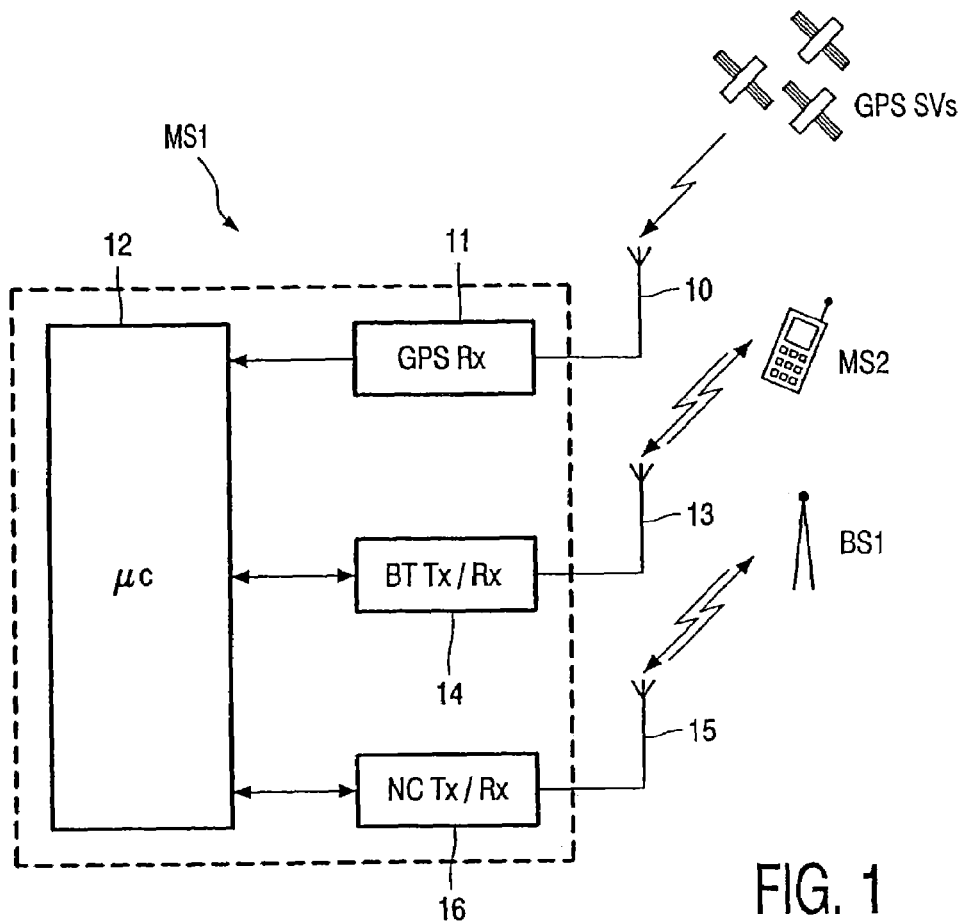
FIG. 1 shows, schematically, a pair of mobile cellular telephones MS1, MS2 each comprising a GPS receiver with an additional wireless communication capability independent of a cellular telephone network.

Referring to FIG. 1, mobile cellular telephone MS1 is shown comprising a communications transmitter and receiver (C Tx/Rx) 16 connected to a communications antenna 15 and controlled by a microprocessor (µc) 12 for two-way communication with a cellular telephone network base station BS1 with which it is registered.

In addition, cellular telephone MS1 comprises a GPS receiver (GPS Rx) 11 connected to a GPS antenna 10 and also controlled by the microprocessor (µc) 12 for receiving GPS spread spectrum signals transmitted from orbiting GPS satellites. When operative, the GPS receiver 11 receives NAVSTAR SPS GPS signals through the GPS antenna 10 and pre-processes them, typically by passive bandpass filtering in order to minimise out-of-band RF interference, preamplification, down conversion to an intermediate frequency (IF) and analog to digital conversion. The resultant, digitized IF signal remains modulated, still containing all the information from the available satellites, and is fed into a memory of the microprocessor 12. The GPS signals may then be acquired and tracked for the purpose of deriving pseudorange information. Of course, such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House.

Cellular telephone MS1 also comprises a Bluetooth communications transmitter and receiver (BT Tx/Rx) 14 connected to a Bluetooth communications antenna 13 and controlled by the microprocessor (µc) 12 for short range, two-way Bluetooth communication. As illustrated in FIG. 1, such communication may be with another mobile cellular telephone MS2 and independent from the cellular telephone network. Cellular telephone MS2 is substantially identical to cellular telephone MS1.

Consider the scenario where cellular telephone MS1 is required to determine its position, say to provide its location to the emergency services operator (termed public safety answer point in the U.S.) in the event of an emergency call, but its GPS receiver 12 is only able to acquire two of the four GPS signals required to provide an unambiguous position fix. In such a scenario, using its Bluetooth communication transmitter (BT Tx) 14, cellular telephone MS1 broadcasts a request to other Bluetooth receivers in the vicinity requesting that they respond by providing supplemental ranging information. Cellular telephone MS2 located nearby receives the request and at the time of the request is able to see two GPS satellites, both different from those acquired by cellular telephone MS1, and from them take pseudorange measurements. Also, cellular telephone MS2 is able to make an absolute range measurement using a time-of-arrival technique with the base station with which it is registered.

In response to the request from cellular telephone MS1, cellular telephone MS2 replies by sending its ranging information together with corresponding reference locations in co-ordinate form. The reference information for GPS pseudoranges, i.e. the position of the GPS SVs, may be derived from GPS data message and the position of the base station from which the absolute range measurement from cellular telephone MS2 is made may be transmitted from the base station to cellular telephone MS2 prior to its inclusion in the reply by cellular telephone MS2 to cellular telephone MS1. Upon receiving the reply, cellular telephone MS1 then has addition ranging information available to it to supplement its own, as summarized in Table 1 below.

TABLE 1

Ranging information available to cellular telephone MS1

| Device | Information (with reference location) | Unknowns |
|---|---|---|
| MS1 | Pseudorange from GPS satellite to MS1 | Clock error 1 |
| MS1 | Pseudorange from GPS satellite to MS1 | Clock error 1 |
| MS2 | Pseudorange from GPS satellite to MS2 | Clock error 2 |
| MS2 | Pseudorange from GPS satellite to MS2 | Clock error 2 |
| MS2 | Absolute range measurement | — |

As there are three unknown co-ordinates of the position estimate, i.e. x, y and z, and two clock errors totalling 5 unknowns; and as there are 5 independent ranges/pseudoranges, it is possible for cellular telephone MS1 to determine its location. Of course, this position estimate is equally applicable to MS2 and may be provided to MS2 using the Bluetooth link.

Figure 2:
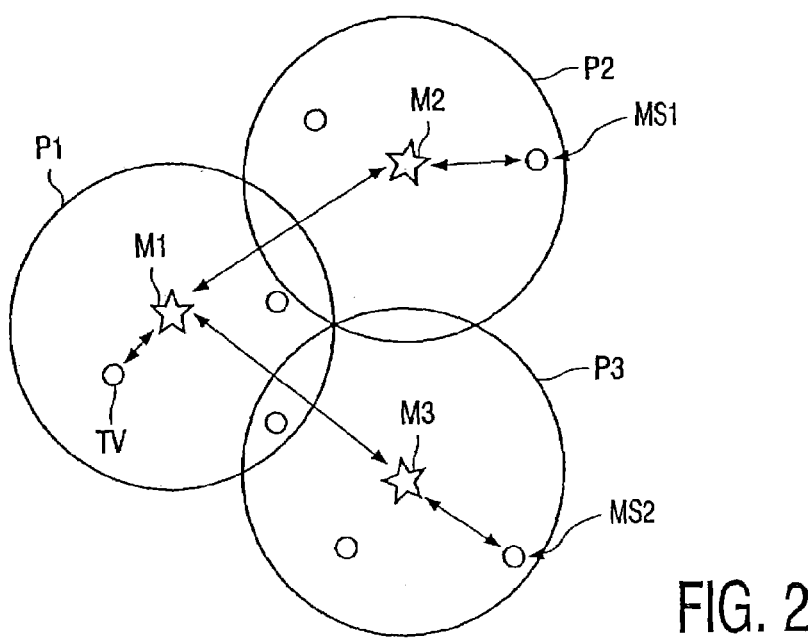
FIG. 2 illustrates, schematically, the interaction of the pair of mobile cellular telephones MS, MS2 of FIG. 1 in the context of adjacent piconets.

Referring to FIG. 2, the pair of mobile cellular telephones MS1, MS2 of FIG. 1 in the context of adjacent wireless piconets P1, P2, P3. I.e. wireless networks of devices in each of which one device is designated a masters M1, M2 and M3 (denoted by stars) and is able to communicate with slave devices (denoted by small circles) within its piconet. Each master is capable of communication with other master devices in adjacent piconets.

For example, a television TV in piconet P1 without any means to determine its own position may communicate with its master M1, for example a personal computer, and requests that it receive an approximate position fix. This may be in order to effect TV access control whereby only when the present location is consistent with an authorized location are the incoming video signals decrypted and displayed.

Upon receiving said request, master M1 communications with masters M2, M3 of adjacent piconets requesting that they broadcast across their respective piconets requests for ranging information of the aforementioned kind. Cellular telephones MS1, MS2 located within piconets P2 and P3 respectively receive such a request and transmit their ranging information to master M1 via their respective masters M2 and M3. Master device M1 calculates a position fix using the ranging information supplied by MS1 and MS2, and transmits this information to the TV within its piconet so as to enable the TV to effect access control. I.e. the TV uses an estimate of the position of cellular telephones MS1 and MS2 as an estimate of its own position. In this example, the position calculation is done at the master M1 which may itself be without any means to provide a range measurement. If either MS1 or MS2 were individually able to determine their position, this position estimate could be provided via respective masters and master M1 to the television.

In order to reduce the time to first fix, a GPS receiver of either or both cellular telephones MS1 and MS2 may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined; and the current PRN code phase. With such assistance, it is possible to sweep only a narrowed range of frequencies and code phases in which the target PRN code is known to occupy, thereby reducing the number of code instances that need to be checked and thus reducing the time for code acquisition. Base station assistance is further described in relation to a fixed base station in U.S. Pat. Nos. 5,841,396 and 5,874,914 which are incorporated herein by reference.

Via the piconets, such assistance may be provided to MS1 and MS2 either between each other or by a further device in possession of relevant information, say an up to date almanac and ephemeris data. Ideally, MS1 and MS2 are each capable of reciprocating such assistance in that one may be able to provide the other with Doppler information relating to the satellites in view, and on occasion receive and use such Doppler information provided by the other.

At present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS refers to any positioning system comprising a plurality of radio transmitters at different locations and a receiver which determines its location based on the time of arrival of the transmissions of the radio transmitters. In so far as a telephone is concerned, this would also include base station triangulation in which timing measurements were taken by the base stations and relayed back to the mobile telephone.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A method of providing an estimate of a location of a first device comprising the steps of:
   obtaining at least one range measurement from the first device to a corresponding reference point;
   obtaining from a second device at least one range measurement from the second device to a corresponding reference point, the second device being located near to the first device; and
   calculating an estimate of the location of the first device using (i) range measurements obtained with respect to bath the first and second devices and (ii) co-ordinates of the corresponding references points,
   wherein at least one range measurement obtained from the second device is obtained with respect to a corresponding reference point that is ground-based to which no range measurements were obtained by the first device.

2. The method according to claim 1, wherein for each range measurement obtained in the second device an indication of the corresponding reference point is provided to the first device for calculating an estimate of the location of the devices.

3. The method according to claim 1, wherein an indication of the corresponding reference point is provided to the first device using a wireless communications link.

4. The method according to claim 1, further comprising the step of:
provinding the estimate of the location of the first device from the first device to the second device.

5. The method according to claim 1, further comprising the step of:
for each range measurement obtained in the first device an indication of the corresponding reference point is provided to the second device.

6. The method according to claim 1 further comprising the step of:
providing for each range measurement obtained in respect of both the first and second devices an indication of the associated reference point to a third device for calculating an estimate of the location of the first and second devices.

7. The method according to claim 1, wherein at least one range measurement obtained with respect to either the first or the second device is a pseudorange measurement; and wherein the estimate of the location of the devices is calculated by additionally resolving corresponding clock error.

8. The method according to claim 1 wherein the second device includes a GPS receiver; and wherein at least two range measurements obtained in respect of the second device are pseudorange measurements from a GPS space vehicle.

9. The method according to claim 1 wherein the first device includes a GPS receiver, wherein at least two range measurements obtained in respect of the first device are pseudorange measurements from a GPS space vehicle, and wherein at least a total of 5 pseudorange are obtained in respect of either the first or the second device.

10. The method according to claim 7 wherein clocks errors of both the first and second devices are resolved.

11. The method according to claim 1 wherein the first and second device both include a GPS receiver; wherein a single range measurement obtained in respect of either the first or second device is a pseudorange measurement from a GPS space vehicle; and wherein the first and second device are synchronized.

12. The method according to claim 1 wherein at least one range measurement obtained in respect of either the first or the second device is a range measurement to a ground based reference point.

13. The method according to claim 1 wherein the at least one range measurement is determined by a time-of-arrival measurement with respect to a fixed base station.

14. The method according to claim 13 wherein either the first and/or the second device is a mobile cellular telephone able to communicate directly with the other device using a wireless communications link which is independent of any cellular basestation network; and wherein the time-of-arrival measurement is provided between the mobile cellular telephone and a cellular telephone network basestation.

15. The method according to claim 1 wherein for at least one range measurement, the indication of the corresponding reference point is in the form of a position co-ordinate.

16. A device able to provide an estimate of its location comprising:
ranging means for obtaining at least one range measurement from the device to a known reference point;
a receiver for receiving ranging information from a second device relating to at least one range measurement from the second device to a second known reference point; and
a processor for calculating an estimate of the location of the device using (i) the range measurements obtained and (ii) co-ordinates of the corresponding reference points, wherein at least one range measurement obtained from the ranging information was obtained with respect to the corresponding second reference point is ground-based to which no range measurements were obtained by the device.

17. The device according to claim 16 further comprising:
a transmitter for transmitting the estimate of the location of the device to the second device.

18. The device according to claim 16 further comprising:
a transmitter wherein upon receiving a request for ranging information from the second device located nearby the device transmits its range measurements together wit the indication of the corresponding reference point to the requesting device.

19. The device according to claim 16 wherein the ranging means is adapted to obtaining at least one pseudorange measurement; and wherein the estimate of the location of the device is calculated by additionally resolving corresponding clock error.

20. The device according to claim 19 wherein the processor is adapted to calculate an estimate of the location of the device using pseudorange measurements obtained by both its ranging means and from the ranging information.

21. The device according to claim 20 wherein the processor is adapted to resolve clocks errors associated with pseudorange measurements obtained by both its ranging means and from the ranging information.

22. The device according to claim 16 wherein the ranging means includes a GPS receiver.

23. The device according to claim 16 in the form of a mobile cellular telephone to communicate directly with the second device located nearby using a wireless communications link which is independent of any cellular basestation network.

24. The device according to claim 23 wherein the cellular telephone is adapted to provide a time-of-arrival measurement between the mobile cellular telephone and a cellular telephone network basestation.

* * * * *